Sept. 25, 1923.
J. H. JACOBS
1,469,070
SAFETY ADJUSTING MEANS FOR PRESSURE COOKER LOCKS
Filed Jan. 18, 1923
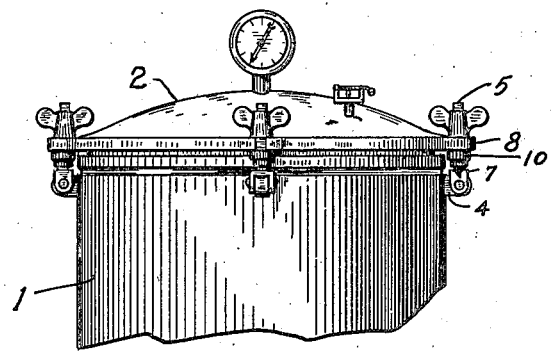
Fig. 1
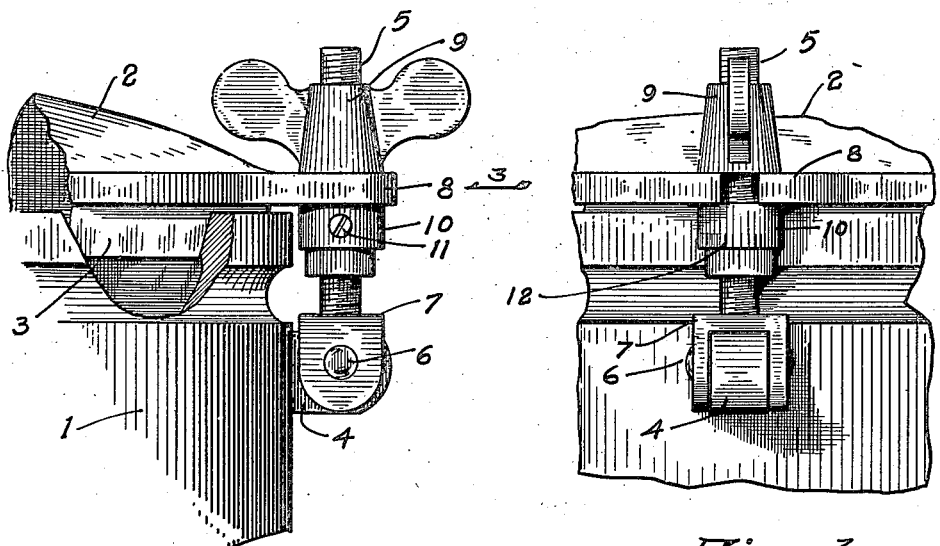
Fig. 2.
Fig. 3.
Inventor
Joseph H. Jacobs.
By A. J. O'Brien
Attorney Patented Sept. 25, 1923.

1,469,070

UNITED STATES PATENT OFFICE.

JOSEPH H. JACOBS, OF DENVER, COLORADO.

SAFETY ADJUSTING MEANS FOR PRESSURE-COOKER LOCKS.

Application filed January 18, 1923. Serial No. 613,415.

*To all whom it may concern:*

Be it known that I, JOSEPH H. JACOBS, a citizen of the United States, residing at the city and county of Denver and State of Colorado, have invented certain new and useful Improvements in Safety Adjusting Means for Pressure-Cooker Locks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to pressure cookers and has special reference to the means for locking the cover in place.

Pressure cookers are well known and they comprise a pot provided with a cover which can be connected to the latter with a steam tight joint. In order to hold the cover to the pot, the latter has hingedly connected thereto at spaced intervals about its upper edge, a plurality of bolts which are provided with winged nuts and which engage with outwardly extending lugs on the cover so that the latter may be securely clamped to the pot. In securing the cover to the pot, from three to six bolts are used, and these are tightened at random, with the result that some are too tight and others are too loose. A pressure cooker is intended to carry a pressure of fifteen to twenty-five pounds of steam and is provided with a safety valve that is designed to become operative if the pressure exceeds the maximum. It sometimes happens that the safety valve becomes inoperative for some reason and in such cases a disastrous explosion is liable to occur, unless the clamping screws have been so adjusted that the steam may escape between the cover and the pot, if it exceeds the maximum safe pressure. As the bolts are tightened by guess only, they are nearly always made so tight that the steam cannot escape between the cover and the pot, even at a pressure that will burst the cooker.

It is the object of this invention to provide a simple means which can be applied at the factory and so adjusted that the clamping bolts will all be tightened uniformly and to such an extent only that steam will be permitted to escape between the cover and the pot if the safety valve becomes inoperative and the pressure gets too high.

I attain the above objects by means of a construction which I will now describe, reference being had for this purpose to the accompanying drawings, in which;

Fig. 1 is a side elevation of the upper portion of a steam pressure cooker equipped with my improvement.

Fig. 2 is a view to an enlarged scale of a portion of the pressure cooker showing my invention in place thereon; and Fig. 3 is a view looking in the direction of the arrow 3—3, Fig. 2.

The same reference numerals will be employed to designate the same parts throughout the several views.

In the drawings numeral 1 designates the pot and 2 the cover portions of an ordinary steam pressure cooker. The inner upper edge of the pot is usually chamfered and the cover is provided with a downwardly projecting flange 3 which is tapered to fit the chamfered portion of the pot. Secured to the outside of the pot, near the upper edge thereof, are a number of equally spaced lugs 4 to which are pivotally connected clamping bolts 5. The lower end of each bolt is forked so as to straddle the lug 4 and is held in place by a pin 6. A shoulder 7 is provided at the lower end of the bolt. The cover has two outwardly projecting lugs 8 corresponding to each bolt. The bolts are each provided with a wing nut 9 and are threaded throughout their entire length. When the cover is put into place, the bolts 5 are swung upwardly between lugs 8 and the nuts 9 screwed down until the cover is clamped down with the required pressure.

As explained above, there is nothing to determine the extent to which the clamping bolts shall be tightened, except the judgement of the operator which is highly unreliable for such a purpose. The result of this is that the cover is clamped down very tight and very unevenly which makes the danger of a disastrous explosion very great if the safety valve fails to function.

In order to enable the cover to be clamped into place with the desired tightness and uniformity, I have provided the following simple means:—A nut 10 is screwed onto the bolt before the wing nut 9 and is at first screwed down against the shoulder 7. The cover is then put into place and the nuts 9 turned so as to clamp the cover down with a gentle pressure. The inside of the cooker is then subjected to the maximum normal working pressure and the nuts 9 screwed down until no leakage occurs between the cover and the pot, care being taken to adjust each nut so as to produce the same tension in each bolt. The pressure is then increased about three pounds per square inch and the nuts 9 again adjusted, if necessary, so that steam will begin to escape between the cover and the pot, the idea being to so adjust the tension of the bolts 5 that there will be no leakage at normal maximum pressure, but if the pressure exceeds this by two or three pounds, leakage will occur and increase, with the increase of pressure, thus permitting the escape of steam when the pressure becomes dangerous, even if the saftey valve is inoperative. In order to make it possible to duplicate the adjustment without special effort, I screw the stop nuts 10 upwardly on each bolt until they contact the lower side of the lugs 8 and then lock the nuts against turning by means of the set screw 11. It is now evident that the cover can be removed and replaced and the proper adjustment obtained by tightening the nuts 9 as much as possible, since the cover can move no farther after it abuts the upper surface of the nuts 10. The nuts 10 are provided with a series of graduations 12 equally spaced about their circumference, the purpose of which is to permit the nuts to be moved an equal amount whenever it is found necessary to alter the adjustment to compensate for wear.

From the above, it will be apparent that by means of the simple expedient of providing stop nuts 10 on each bolt below the lugs 8 of the cover and carefully adjusting the position of these nuts in the factory, it is possible to insure a uniform and proper tightening of the cover in every instance. The cover and pot are of course, provided with marks so that the same lugs will always cooperate with the same bolts.

The means described above, although simple, are of great importance in this particular relationship, as accidents have frequently occurred due to excessive pressure when the safety valve has been inoperative.

Having now described my invention, what I claim is:

1. In a pressure cooker, the combination comprising a pot; a cover adapted to be secured to said pot with a steam tight fit; means for clamping the cover to the pot, comprising a number of bolts secured to the pot; lugs on the cover provided with slots for the reception of said bolts; nuts on the bolts engaging the top of the lugs on the cover and stop nuts on each bolt adapted to engage the lower surface of the lugs and limit the downward movement of the cover to a predetermined amount.

2. In a pressure cooker, the combination comprising a pot; a cover therefor; means for clamping the cover to the pot, said means comprising a plurality of pairs of spaced lugs on the cover; bolts secured to the pot and cooperating with the lugs; nuts on the bolts for engaging the upper surface of the lugs and force the cover against the pot; and stop nuts on said bolts located below the lugs and adjusted so that the cover can be clamped against the pot with a force that does not exceed a predetermined amount.

In testimony whereof I affix my signature.

JOSEPH H. JACOBS.